(12) United States Patent
Chang

(10) Patent No.: US 6,184,170 B1
(45) Date of Patent: Feb. 6, 2001

(54) METALLOCENE CATALYST SYSTEMS

(75) Inventor: Main Chang, Houston, TX (US)

(73) Assignee: Exxon Chemical Patents, Inc., Baytown, TX (US)

( * ) Notice: Under 35 U.S.C. 154(b), the term of this patent shall be extended for 0 days.

(21) Appl. No.: 09/565,854

(22) Filed: May 5, 2000

Related U.S. Application Data

(62) Division of application No. 08/861,902, filed on May 22, 1997.
(60) Provisional application No. 60/026,946, filed on Sep. 24, 1996.

(51) Int. Cl.[7] .................................................. B01J 31/14
(52) U.S. Cl. .................... 502/118; 502/108; 502/152; 502/158; 526/128; 526/160; 526/162; 526/943
(58) Field of Search ..................................... 502/108, 118, 502/152, 158; 526/128, 160, 162, 943

(56) References Cited

U.S. PATENT DOCUMENTS 5,296,566 * 3/1994 Brown-Wensley et al. ......... 526/171
5,346,925 9/1994 Toshihiko et al. .
5,444,134 8/1995 Matsumoto .
5,554,704 9/1996 Burkhardt et al. .

FOREIGN PATENT DOCUMENTS

| 2093056 | 3/1993 | (CA) . |
| 748823 | 12/1996 | (EP) . |
| WO 95/25129 | 9/1995 | (WO) . |
| WO 96/34020 | 10/1996 | (WO) . |
| WO 97/27224 | 7/1997 | (WO) . |

* cited by examiner

*Primary Examiner*—David W. Wu
*Assistant Examiner*—Caixia Lu
(74) *Attorney, Agent, or Firm*—Joseph F. Reidy; C. Paige Schmidt

(57) ABSTRACT

This invention relates generally to metallocene catalyst systems and to methods for their production and use. Specifically, this invention relates to a method for preparing metallocene catalyst systems using olefin additives which promote catalyst activity.

45 Claims, No Drawings

METALLOCENE CATALYST SYSTEMS

This application claims priority from U.S. Provisional Application No. 60/026,946, filed Sep. 24, 1996, and is a Divisional of U.S. application Ser. No. 08/861,902, filed May 22, 1997 allowed.

FIELD OF THE INVENTION

This invention relates generally to metallocene catalyst systems and to methods for their production and use. Specifically, this invention relates to a method for preparing metallocene catalyst systems using olefin additives which promote catalyst activity.

BACKGROUND

Metallocene catalyst systems are well known in the art. While the prior art discloses the use of olefins to prepare prepolymer and the use of polyolefins as supports, the prior art does not disclose the use of olefins as a reactant with the metallocene active site to promote catalyst system activity. For example, U.S. Pat. No. 5,346,925 describes supporting catalyst components on porous polymer supports such as polystyrenes. Canadian Patent Application No. 2,093,056 also describes using polymeric supports such as polystyrenes. WO 96/34020 describes a catalyst system prepared with an inert hydrocarbon and WO 95/25129 describes a method for preparing catalyst systems using a spray drying technique which can include polystyrene microparticles. EP 748823 A1 describes the use of styrene and styrenic compounds combined with certain transition metal compounds and modified alumoxanes to prepare catalyst systems.

The present inventor has discovered that the activity of metallocene catalyst systems is substantially increased when certain olefin promoters are used to prepare the catalyst systems.

SUMMARY

This invention relates to metallocene catalyst systems comprising the reaction product of a mixture comprising a metallocene, an activator, and promoter wherein the promoter comprises a styrene, a substituted styrene or a compound represented by the formula:

(1.) R—CH=CH$_2$ wherein R may be a C$_6$–C$_{10}$ aryl group which may be halogenated, or a C$_7$–C$_{40}$ alkylaryl group; or (2) R$^1$R$^2$R$^3$MCH=CH$_2$ wherein R$^1$ may be a C$_6$–C$_{10}$ aryl group which may be halogenated, or a C$_7$–C$_{40}$ alkylaryl group, R$^2$ and R$^3$ are identical or different and may be a C$_6$–C$_{10}$ aryl group which may be halogenated, a C$_7$–C$_{40}$ alkylaryl group or a C$_1$–C$_{10}$ alkyl group which may be halogenated, preferably a C$_1$–C$_3$ alkyl group; M is carbon, silicon, germanium or tin; wherein the molar ratio of the metallocene to promoter in the mixture is in the range of from about 1:1 to about 1:1000.

This invention also relates to metallocene catalyst systems comprising the reaction product of a mixture comprising a metallocene, an activator, and a styrene or substituted styrene wherein the catalyst system is essentially free of polystyrene.

In another embodiment this invention relates to a method for forming, a metallocene catalyst system comprising: combining at least one metallocene, at least one activator, and promoter wherein the promoter comprises a styrene or substituted styrene, a compound represented by the formula Ph—SiR$^1$R$^2$—CH=CH$_2$ wherein R$^1$ and R$^2$ are independently an alkyl group, an arylalkyl, or an alkylaryl; and wherein the amount of promoter is such that the molar ratio of metallocene to promoter is in the range of from about 1:1 to about 1:1000.

In another embodiment this invention relates to a method for forming a supported metallocene catalyst system comprising: (a) combining at least one metallocene and at least one activator to form an activated metallocene; then (b) adding a promoter; then (c) combining the mixture with support material; wherein the promoter comprises a styrene, a substituted styrene or a compound represented by the formula Ph—SiR$^1$R$^2$—CH=CH$_2$ wherein R$^1$ and R$^2$ are independently an alkyl group, an arylalkyl, or an alkylaryl; and wherein the amount of promoter added in step (b) is such that the molar ratio of metallocene to promoter is in the range of from about 1:1 to about 1:1000.

In another embodiment this invention relates to a method for forming a supported metallocene catalyst system comprising: (a) combining at least one metallocene and at least one activator to form an activated metallocene; (b) mixing the activated metallocene with support material; and then (c) adding a promoter to the mixture wherein the promoter comprises styrene or a substituted styrene or is represented by the formula: Ph—SiR$^1$R$^2$—CH=CH$_2$ wherein R$^1$ and R$^2$ are independently an alkyl group, an arylalkyl, or an alkylaryl; and wherein the amount of promoter added in step (c) is such that the molar ratio of metallocene to promoter is in the range of from about 1:1 to about 1:1000.

In another embodiment this invention relates to a method for forming a metallocene catalyst system comprising: (a) combining at least one metallocene with at least one promoter; then (b) adding at least one activator; then (c) combining the mixture with support material wherein the promoter comprises styrene, substituted styrene or is represented by the formula Ph—SiR$^1$R$^2$—CH=CH$_2$ wherein R$^1$ and R$^2$ are independently an alkyl group, an arylalkyl, or an alkylaryl; wherein the amount of promoter added is such that the molar ratio of metallocene to promoter is in the range of from about 1:1 to about 1:1000.

DETAILED DESCRIPTION

Examples of substituted sytrenes include but are not limited to: 4-methylstyrene, 3-methylstyrene, 3(4)-methylstyrene, 4-t-butylstyrene, 4-fluorostyrene, 2-fluorostyrene, and 3-fluorostyrene.

As used herein, the term "essentially free of polystyrene" means that the catalyst system when completely dry contains less than about 5 weight percent polystyrene. "Polystyrene" refers to a polymer of styrene or substituted styrene.

As used herein, the term "essentially no polymerization of styrene" means that the catalyst system when completely dry is essentially free of polystyrene.

Catalyst System Components

Metallocenes

As used herein "metallocene" refers generally to compounds represented by the formula Cp$_m$MR$_n$X$_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798;

5,057,475; 5,120,867; 5,278,119; 5,304,614; 5,324,800; 5,350,723; 5,391,790; and 5,510,502 each fully incorporated herein by reference.

Preferred metallocenes are those represented by the formula:

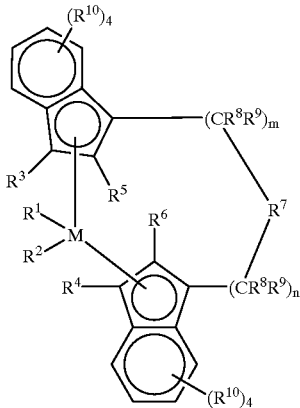

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —N($R^{15}$)2, —S$R^{15}$, —O$R^{15}$, —OSi($R^{15}$)3 or —P($R^{15}$)2 radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

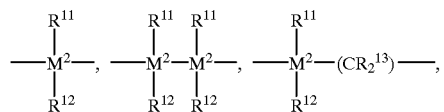

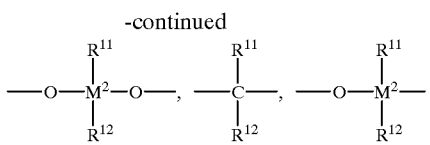

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, form a ring system;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred metallocenes are compounds of the structures (A) and (B):

(A)

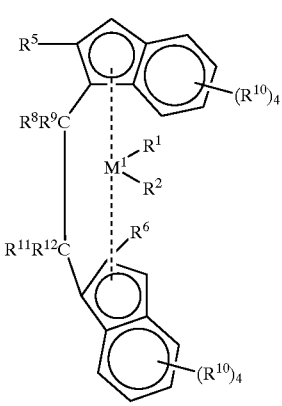

-continued (B)

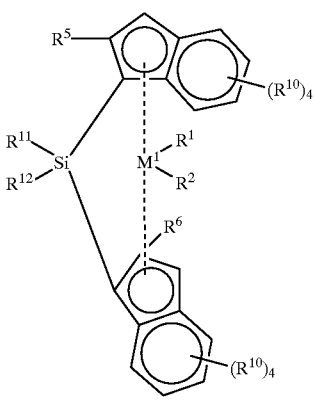

wherein:
M¹ is Zr or Hf, R¹ and R² are methyl or chlorine, and R⁵, R⁶, R⁸, R⁹, R¹⁰, R¹¹ and R¹² have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multistep process involving repeated deprotonations/metallations of the aromatic ligands and introduction of the bridge and the central atom by their halogen derivatives. The following reaction scheme illustrates this generic approach:

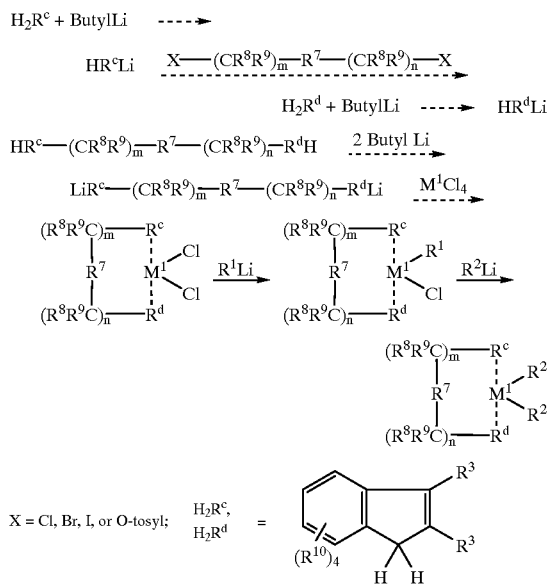

Additional methods for preparing metallocenes are fully described in the *Journal of Organometallic Chem.*, volume 288, (1985), pages 63–67, and in EP-A-320762, both of which are herein fully incorporated by reference.

Illustrative but non-limiting examples of preferred metallocenes include:

Dimethylsilandiylbis(2-methyl-4-phenyl-1-indenyl)ZrCl₂
Dimethylsilandiylbis(2-methyl-4,5-benzoindenyl)ZrCl₂;
Dimethylsilandiylbis(2-methyl-4,6-diisopropylindenyl)ZrCl₂;
Dimethylsilandiylbis(2-ethyl-4-phenyl-1-indenyl)ZrCl₂;
Dimethylsilandlylbis (2-ethyl-4-naphthyl-1-indenyl)ZrCl₂,
Phenyl(methyl)silandiylbis(2-methyl-4-phenyl-1-indenyl)ZrCl₂,
Dimethylsilandiylbis(2-methyl-4-(1-naphthyl)-1-indenyl)ZrCl₂,
Dimethylsilandiylbis(2-methyl-4-(2-naphthyl)-1-indenyl)ZrCl₂,
Dimethylsilandiylbis(2-methyl-indenyl)ZrCl₂,
Dimethylsilandiylbis(2-methyl-4,5-diisopropyl-1-indenyl)ZrCl₂,
Dimethylsilandiylbis(2,4,6-trimethyl-1-indenyl)ZrCl₂,
Phenyl(methyl)silandiylbis(2-methyl-4,6-diisopropyl-1-indenyl)ZrCl₂,
1,2-Ethandiylbis(2-methyl-4,6-diisopropyl-1-indenyl)ZrCl₂,
1,2-Butandiylbis(2-methyl-4,6-diisopropyl-1-indenyl)ZrCl₂,
Dimethylsilandiylbis(2-methyl-4-ethyl-1-indenyl)ZrCl₂,
Dimethylsilandiylbis(2-methyl-4-isopropyl-1-indenyl)ZrCl₂,
Dimethylsilandiylbis(2-methyl-4-t-butyl-1-indenyl)ZrCl₂,
Phenyl(methyl)silandiylbis(2-methyl-4-isopropyl-1-indenyl)ZrCl₂,
Dimethylsilandiylbis(2-ethyl-4-methyl-1-indenyl)ZrCl₂,
Dimethylsilandiylbis(2,4-dimethyl-1-indenyl)ZrCl₂,
Dimethylsilandiylbis(2-methyl-4-ethyl-1-indenyl)ZrCl₂,
Dimethylsilandiylbis(2-methyl-α-acenaphth-1-indenyl)ZrCl₂,
Phenyl(methyl)silandiylbis(2-methyl-4,5-benzo-1-indenyl)ZrCl₂,
Phenyl(methyl)silandiylbis(2-methyl-4,5-(methylbenzo)-1-indenyl)ZrCl₂,
Phenyl(methyl)silandiylbis(2-methyl-4,5-(tetramethylbenzo)-1-indenyl)ZrCl₂,
Phenyl(methyl)silandiylbis(2-methyl-a-acenaphth-1-indenyl)ZrCl₂,
1,2-Ethandiylbis(2-methyl-4,5-benzo-1-indenyl)ZrCl₂,
1,2-Butandiylbis(2-methyl-4,5-benzo-1-indenyl)ZrCl₂,
Dimethylsilandiylbis(2-methyl-4,5-benzo-1-indenyl)ZrCl₂,
1,2-Ethandiylbis(2,4,7-trimethyl-1-indenyl)ZrCl₂,
Dimethylsilandiylbis(2-methyl-1-indenyl)ZrCl₂,
1,2-Ethandiylbis(2-methyl-1-indenyl)ZrCl₂,
Phenyl(methyl)silandiylbis(2-methyl-1-indenyl)ZrCl₂,
Diphenylsilandiylbis(2-methyl-1-indenyl)ZrCl₂,
1,2-Butandiylbis(2-methyl-1-indenyl)ZrCl₂,
Dimethylsilandiylbis(2-ethyl-1-indenyl)ZrCl₂,
Dimethylsilandiylbis(2-methyl-5-isobutyl-1-indenyl)ZrCl₂,
Phenyl(methyl)silandiylbis(2-methyl-5-isobutyl-1-indenyl)ZrCl₂,
Dimethylsilandiylbis(2-methyl-5-t-butyl-1-indenyl)ZrCl₂,
Dimethylsilandiylbis(2,5,6-trimethyl-1-indenyl)ZrCl₂, and the like.

These preferred metallocene catalyst components are described in detail in U.S. Pat. Nos. 5,145,819, 5,243,001; 5,239,022; 5,329,033; 5,296,434; 5,276,208; and 5,374,752; and EP 549 900 and 576 970 all of which are herein fully incorporated by reference.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes are preferably used as activators, most preferably methylalumoxane (MAO). Generally alkylalumoxanes contain about 5 to 40 of the repeating units:

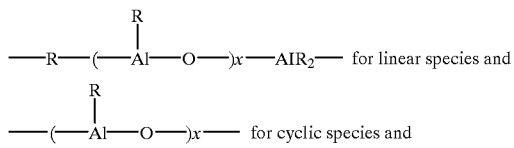

——R——(——Al——O——)$x$——AlR$_2$—— for linear species and

——(——Al——O——)$x$—— for cyclic species and where R is a $C_1$–$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference. (as used herein unless otherwise stated "solution" refers to any mixture including suspensions.)

Ionizing activators may also be used to activate metallocenes. These activators are neutral or ionic, or are compounds such as tri(n-butyl)ammonium tetrakis (pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for it in situ processes describing the reaction of alkyl aluminum compounds with dihalo-substituted metallocene compounds prior to or with the addition of activating anionic compounds.

Support Materials

The metallocene catalyst systems of this invention are preferably supported. Any support material may be used, however, preferably porous particulate materials are used such as talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle diameter in the range of from about 10 to about 500 $\mu$m. More preferably, the surface area is in the range of from about 50 to about 500 $m^2/g$, the pore volume is in the range of from about 0.5 to about 3.5 cc/g and the average particle diameter is in the range of from about 20 to about 200 $\mu$m. Most preferably the surface area is in the range of from about 100 to about 400 $m^2/g$, the pore volume is in the range of from about 0.8 to about 3.0 cc/g about 3.0 cc/g and the average particle diameter is in the range of from about 30 to about 100 $\mu$m. The average pore diameter of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 800° C. anywhere from about 3 to about 24 hours.

Methods for Preparing the Catalyst System

The catalyst systems and methods of this invention are distinguished by the use of an olefin promoter during the preparation of the catalyst system. It has been surprisingly found that these catalyst systems exhibit markedly increased activity.

"Promoter" is defined herein to mean one or more compounds selected from the (group consisting of styrene, a substituted styrene or a compound represented by the formula:

(1.) R—CH=CH$_2$ wherein R may be a C$_6$–C$_{10}$ aryl group which may be halogenated, or a C$_7$–C$_{40}$ alkylaryl group; or (2) R$^1$R$^2$R$^3$MCH=CH$_2$ wherein R$^1$ may be a C$_6$–C$_{10}$ aryl group which may be halogenated, or a C$_7$–C$_{40}$ alkylaryl group, R$^2$ and R$^3$ are identical or different and may be a C$_6$–C$_{10}$ aryl group which may be halogenated, a C$_7$–C$_{40}$ alkylaryl group or a C$_1$–C$_{10}$ alkyl group which may be halogenated, preferably a C$_1$–C$_3$ alkyl group; M is carbon, silicon, germanium or tin.

Preferably, the promoter is represented by the formula Ph—SiR$^1$R$^2$—CH=CH$_2$ wherein R$^1$ and R$^2$ are independently an alkyl group, an arylalkyl, or an alkylaryl.

Examples of promoters include but are not limited to one or more of the following: styrene, phenyldimethylvinylsilane, 4-methylstyrene, 4-t-butylstyrene, 4-fluorostyrene, Ph$_3$SiC$_2$H$_3$, Ph$_2$CH$_3$SiC$_2$H$_3$, 4-vinylnaphthalene, 4-vinylbiphenyl, allylbenzene, and (CH$_3$)$_3$SiC$_2$H$_3$, Et$_2$CH$_3$SiC$_2$H$_3$.

The catalyst systems of this invention comprise an amount of promoter such that the finished catalyst system is essentially free from prepolymer or polymerized promoter. Thus the catalyst systems of this invention are distinguished from metallocene catalyst systems supported on polymer such as polystyrene as well as metallocene catalyst systems that are prepolymerized with olefin such as styrene.

The molar ratio of metallocene to promoter used to prepare the catalyst system is preferably in the range of from about 1:1 to about 1:1000, more preferably in the range of from about 1:1 to about 1:100, even more preferably in the range of from about 1:1 to about 1:50, and most preferably in the range of from about 1:1 to about 1:20.

As described above, the metallocene catalyst systems of this invention are preferably supported on a porous support such as silica and an alkylalumoxane preferably serves as the activator. The catalyst system may comprise more than one metallocene and/or activator.

The metallocene, activator and support material may be combined in any number of ways. Suitable support techniques are described in U.S. Pat. Nos. 4,808,561 and 4,701,432 (each fully incorporated herein by reference.). Preferably the metallocene and activator are combined and their reaction product supported on the porous support material as described in U.S. Pat. No. 5,240,894 and WO 94/28034, WO 96/00243, and WO 96/00245 (each fully incorporated herein by reference.). The promoter may be added at any point during the formation of the catalyst system.

In a preferred embodiment, the promoter is added to the metallocene/activator reaction product and allowed to react for a time period of from about 10 minutes to about 1 hour. This reaction product is then mixed with the support material.

Regardless of whether the metallocenes and their activator are separately precontacted or whether the metallocenes and activator are combined at once, the total volume of reaction solution applied to the porous support is preferably less than about 4 times the total pore volume of the porous support, more preferably less than about 3 times the total pore volume of the porous support and even more preferably less than about 2 times the total pore volume of the porous support. Procedures for measuring the total pore volume of porous support are well known in the art. The preferred method is described in Volume 1, *Experimental Methods in Catalyst Research,* Academic Press, 1968, pages 67–96.

In one alternative embodiment, the metallocene and activator are precontacted and allowed to react in solution for a time period ranging from about 1 minute to about 16 hours, more preferably at least about 10 minutes, even more preferably from about 10 minutes to about 1 hour. This reaction product is then mixed with the support material and the promoter is added thereafter. In this preferred embodiment, the catalyst system is dried to remove residual solvent prior to use in polymerization.

In another alternative embodiment, the metallocene and promoter are combined and allowed to react, preferably for a time period of from about 10 minutes to about 1 hour, then activator is added and allowed to react, preferably for a time period of from about 10 minutes to about 1 hour, then the mixture is combined with support material.

The catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

In an alternative embodiment the total amount of alumoxane used to activate the metallocene is split into two portions which are preferably about equal. The first portion is reacted with the metallocene in solution to form a reaction product which is then mixed with support material. The second alumoxane portion is then added to the mixture followed by the promoter.

In another alternative embodiment, the catalyst system is prepared using an aliphatic hydrocarbon as at least part of the solvent. This also has been found by the present inventor to lead to increased activity. This embodiment is more fully described in U.S. patent application Ser. No. 60/026,644, now lapsed, ("Improved Method for Preparing Supported Metallocene Catalyst Systems" filed on the same day as this application by the same inventor and fully incorporated herein by reference).

In another alternative embodiment, the catalyst system is prepared using a step wherein a 1-olefin copromoter is added to the catalyst system preferably after the promoter is added. Examples of suitable 1-olefin copromoters include but are not limited to butene-1, hexene-1, octene-1 etc. The mole ratio of metallocene to copromoter added to the catalyst system is preferably in the range of from about 1:1 to about 1:1000, preferably from about 1:1 to about 1:100, most preferaby from about 1:1 to about 1:50. As used herein "copromoter" is defined by the formula: R—CH=CH$_2$ wherein R is an alkyl or C7 to C40 arylalkyl.

PROPOSED METALLOCENE/MAO/STYRENE REACTION MECHANISM

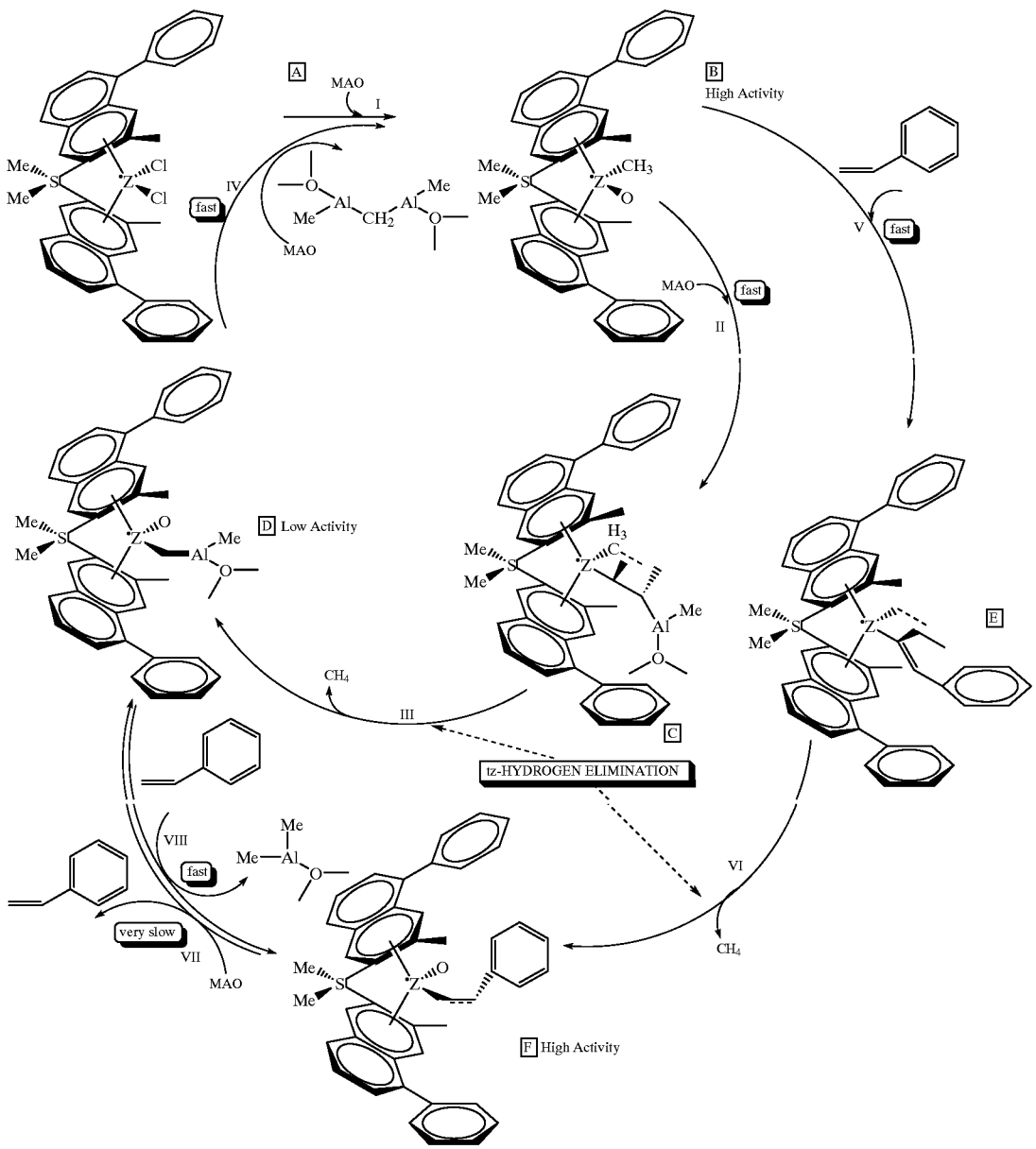

Polymerization and Catalyst System Performance

The catalyst system of this invention may be used in the polymerization of any monomer and optionally comonomers in any process including gas, slurry or solution phase or high pressure autoclave processes. (As used herein, unless differentiated, "polymerization" includes copolymerization and "monomer" includes comonomer.) Preferably, a gas or slurry phase process is used, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

As shown below, the catalyst systems of this invention exhibit markedly increased activity as compared to conventionally prepared metallocene catalyst systems. Any increase in activity is highly desirable particularly in commercial processes.

The polymers and copolymers made by the catalyst systems of the invention are useful in forming operations such as, for example, film, sheet, and fiber extrusion and co-extrusion as well as blow molding, injection molding, sheet thermoforming and rotational molding. Films include blown or cast films in monolayer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or nonwoven form to make filters, diaper fabrics, medical garments, geotextiles, etc. Extruded articles include, for example, medical tubing, wire and cable coatings, geomembranes, and pond liners. Molded articles include single and multi-layered constructions in the form of bottles, tanks, large hollow articles, rigid food containers and toys, etc.

EXAMPLES

Example 1

10 g of silica gel (Davison D-948, Average Particle Size, "APS", =35 μm, dried at 600° C.) was charged into an 8 oz bottle equipped with a magnetic stirring bar. Into a 4 oz. bottle equipped with a magnetic stirring bar, a 0.2 g of rac-Me$_2$Si(2-Me-4-phenylindenyl)$_2$ZrCl$_2$ and 5 ml methylalumoxane ("MAO") in toluene solution (30 wt %) were charged. The mixture was stirred at ambient temperature for 10 minutes. 33 ml of toluene solvent was then charged into the bottle and the mixture was transferred into the 8 oz bottle containing the silica gel. The mixture was allowed to react at ambient temperature for 10 minutes. 6.4 ml of MAO in toluene (30 wt %) was charged into the bottle and the mixture was allowed to react at ambient temperature for 10 minutes. 2.0 ml of styrene (99 wt %) was charged into the bottle and the mixture was allowed to react at ambient temperature for 10 minutes. At the end of the reaction, the mixture was dried by nitrogen purging at 40° C. to 50° C. A free flowing solid was obtained at the end of the preparation.

Into a clean 2-liter autoclave, a 0.3 ml of triethylaluminum in heptane (1.5 M) followed by 1 liter of liquid propylene were charged. The reactor was heated to 70° C. A 100 mg of the catalyst prepared above was then charged into the autoclave through a catalyst injection tube. The catalyst was washed into the autoclave by 200 ml of liquid propylene. The total pressure inside the reactor was around 480 psig. The polymerization was allowed to proceed at 70° C. for 1 hour. After the polymerization, the remaining propylene in the reactor was allowed to evaporate and the polymer was transferred into an evaporation dish. The autoclave inside wall and agitator were very clean. A total of 211 g of polymer was obtained. The product was examined under a microscope and it showed no agglomerated polypropylene particles.

Example 2

Example 1 was repeated except that 1.0 ml of styrene was used. A total of 238 g of polymer was obtained following the polymerization procedure of Example 1.

Example 3

Example 1 was repeated except that 0.5 ml of styrene was used. A total of 246 g of polymer was obtained following the polymerization procedure of Example 1.

Example 4

Example 1 was repeated except that 5.0 ml of styrene was used. A total of 118 g of polymer was obtained following the polymerization procedure of Example 1.

Example 5

10 g of silica gel (Davison D-948, APS=35 μm, dried at 600° C.) was charged into an 8 oz bottle equipped with a magnetic stirring bar. Into a 4 oz bottle equipped with a magnetic stirring bar, 0.2 g of rac-Me$_2$Si(2-Me-4-phenylindenyl)$_2$ZrCl$_2$ and 11.4 ml of MAO in toluene solution (30 wt %) were charged. The mixture was stirred at ambient temperature for 10 minutes. 30 ml of toluene solvent was charged into the 4 oz bottle and the mixture was then transferred into the 8 oz bottle containing the silica gel. The mixture was allowed to react at ambient temperature for 10 minutes. 2.0 ml of styrene (99%) was charged into the bottle and the mixture was allowed to react at ambient temperature for 10 minutes. At the end of the reaction, the mixture was dried by nitrogen purging at 40° C. to 50° C. A free flowing solid was obtained at the end of the preparation. A total of 204 g of polymer was obtained following the polymerization procedure of Example 1.

Example 6 (Comparison)

Example 5 was repeated except that no styrene was added to the catalyst mixture. A total of 172 g of polymer was obtained following the polymerization procedure of Example 1. The product was examined under a microscope and it contained around 90% conglomerated polypropylene particles.

Example 7

Example 6 was repeated except that 1.0 ml of styrene was used. A total of 242 g of polymer was obtained following the polymerization procedure of Example 1.

Example 8

Example 6 was repeated except that 0.5 ml of styrene was used. A total of 267 g of polymer was obtained following the polymerization procedure of Example 1.

Example 9

Example 6 was repeated except that 0.25 ml of styrene was used. A total of 213 g of polymer was obtained following the polymerization procedure of Example 1.

Example 10

Example 6 was repeated except that 0.5 ml of 4-methylstyrene was used. A total of 262 g of polymer was obtained following the polymerization procedure of Example 1.

Example 11

Example 6 was repeated except that 0.5 ml of 4-t-butylstyrene was used. A total of 158 g of polymer was obtained following the polymerization procedure of Example 1.

Example 12

Example 6 was repeated except that 0.5 ml of 4-fluorostyrene was used. A total of 248 g of polymer was obtained following the polymerization procedure of Example 1.

Example 13

10 g of silica gel (Davison D-948, APS=35 $\mu$m, dried at 600° C.) was charged into an 8 oz bottle equipped with a magnetic stirring bar. Into a 4 oz bottle equipped with a magnetic stirring bar, a 0.2 g of rac-Me$_2$Si(2-Me-4-phenylindenyl)$_2$ZrCl$_2$ and 11.1 ml of MAO in toluene solution (30 wt %) were charged. The mixture was stirred at ambient temperature for 10 minutes. 30 ml of toluene solvent was charged into the bottle followed by 0.25 ml of styrene (99%) and the mixture was held at ambient temperature for 1 hour. The mixture was then transferred into the 8 oz bottle containing the silica gel. The mixture was allowed to react at ambient temperature for 10 minutes. At the end of the reaction, the mixture was dried by nitrogen purging(at 40° C. to 50° C. A free flowing solid was obtained at the end of the preparation. A total of 256 g of polymer was obtained following the polymerization procedure of Example 1.

Example 14

Example 14 was repeated except that 0.1 ml of styrene was used. A total of 248 g of polymer was obtained following the polymerization procedure of Example 1.

Example 15

10 g of silica gel (Davison D-948, APS=35 $\mu$m, dried at 600° C.) was charged into an 8 oz bottle equipped with a magnetic stirring bar. A 40 ml of hexane solvent was charged into the bottle. Into a 4 oz bottle equipped with a magnetic stirring bar, a 0.2 g of rac-Me$_2$Si(2-Me-4-phenylindenyl)$_2$ZrCl$_2$ and 11.4 ml of MAO in toluene solution (30 wt %) were charged. The mixture was stirred at ambient temperature for 10 minutes. The mixture was then transferred into the 8 oz bottle containing the slurry of silica gel in hexane. The mixture was allowed to react at ambient temperature for 10 minutes. A 0.5 ml of styrene (99 wt %) was charged into the bottle and the mixture was allowed to react at ambient temperature for 10 minutes. At the end of the reaction, the mixture was dried by nitrogen purging at 40° C. to 50° C. A free flowing solid was obtained at the end of the preparation. A total of 232 g of polymer was obtained following the polymerization procedure of Example 1.

Example 16

10 g of silica gel (Davison D-948, APS=35 $\mu$m, dried at 600° C.) was charged into an 8 oz bottle equipped with a magnetic stirring bar. A 40 ml of hexane solvent was charged into the bottle. Into a 4 oz bottle equipped with a magnetic stirring bar, a 0.2 g of rac-Me$_2$Si(2-Me-4-phenylindenyl)$_2$ZrCl$_2$ and 5 ml of MAO in toluene solution (30 wt %) were charged. The mixture was stirred at ambient temperature for 10 minutes. The mixture was then transferred into the 8 oz bottle containing the slurry of silica gel in hexane. The mixture was allowed to react at ambient temperature for 10 minutes. 6.4 ml of MAO in toluene solution (30 wt %) was charged and the mixture was allowed to react at ambient temperature for 10 minutes. 0.5 ml of styrene (99%) was charged into the bottle and the mixture was allowed to react at ambient temperature for 10 minutes. At the end of the reaction, the mixture was dried by nitrogen purging at 40° C. to 50° C. A free flowing solid was obtained at the end of the preparation. A total of 240 g of polymer was obtained following the polymerization procedure of Example 1.

Example 17

A 10 g of silica gel (Davison D-948, APS=35 $\mu$m, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind)$_2$ZrCl$_2$ and 11.1 ml of MAO in toluene solution (30 wt %) were charged. The mixture was stirred at ambient temperature for 10 minutes. A 30 ml of toluene was added into the bottle. The mixture was then transferred into the 8 oz bottle containing the silica gel. The mixture was allowed to react at ambient temperature for 10 minutes. A 0.5 ml of styrene (99%) was charged and the mixture was allowed to react at ambient temperature for 10 minutes. A 1.0 ml of hexene-1 (99.9%) was charged and the mixture was allowed to react at ambient temperature for 10 minutes. At the end of the reaction, the mixture was dried by nitrogen purging at 40 to 500° C. A free flowing solid was obtained at the end of the preparation. A total of 280 g of polymer was obtained following the polymerization procedure of Example 1.

Example 18

A 10 g of silica gel (Davison D-948, APS=35 $\mu$m, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind)$_2$ZrCl$_2$ and 11.1 ml of MAO in toluene solution (30 wt %) were charged. The mixture was stirred at ambient temperature for 10 minutes. A 30 ml of toluene solvent was charged into the bottle followed by a 0.2 ml of styrene (99%), and the mixture was allowed to react at ambient temperature for 1 hour. A 0.5 ml of hexene-1 (99.9%) was charged and the mixture and allowed to react at ambient temperature for 10 minutes. The mixture was then transferred into the 8 oz bottle containing the silica gel. The mixture was allowed to react at ambient temperature for 10 minutes. At the end of the reaction, the mixture was dried by

Example 19

A 10 g of silica gel (Davison D-948, APS=35 μm, dried at 600° C.) was charged into an 8 oz bottle equipped with a magnetic stirring bar. A 40 ml of hexane solvent was charged into the bottle. Into a 4 oz bottle equipped with a magnetic stirring bar, a 0.11 g of rac-Me$_2$Si(2-Me-Ind)$_2$ZrCl$_2$ and 11.4 ml of MAO in toluene solution (30 wt %) were charged. The mixture was stirred at ambient temperature for 10 minutes. The mixture was then transferred into the 8 oz bottle containing the slurry of silica gel in hexane. The mixture was allowed to to react at ambient temperature for 10 minutes. A 0.5 ml of styrene (99%) was charged into the bottle and the mixture was allowed to react at ambient temperature for 10 minutes. A 1.0 ml of hexene-1 (99.9%) was charged and the mixture was allowed to react at ambient temperature for 10 minutes. At the end of the reaction, the mixture was dried by nitrogen purging at 40 to 500° C. A free flowing solid was obtained at the end of the preparation. A total of 233 g of polymer was obtained following the polymerization procedure of Example 1.

Example 20 (Comparison)

A 10 g of silica gel (Davison D-948, APS=35 μm, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind)$_2$ZrCl$_2$ and 11.4 ml of MAO in toluene solution (30 wt %) were charged. The mixture was stirred at ambient temperature for 10 minutes. A 30 ml of toluene solvent was then charged into the mixture and the mixture was then transferred into the 8 oz bottle containing the silica gel. The mixture was allowed to react at ambient temperature for 10 minutes. At the end of the reaction, the mixture was dried by nitrogen purging at 40 to 50° C. A free flowing solid was obtained at the end of the preparation. A total of 160 g of polymer was obtained following the polymerization procedure of Example 1.

Example 21

A 10 g of silica gel (Davison D-948, APS=35 μm, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind)$_2$ZrCl$_2$ and 5 ml of MAO in toluene solution (30 wt %) were charged. The mixture was stirred at ambient temperature for 10 minutes. A 33 ml of toluene solvent was then charged into the mixture and the mixture was then transferred into the 8 oz bottle containing the silica gel. The mixture was allowed to react at ambient temperature for 10 minutes. A 6.4 ml of MAO in toluene solution (30 wt %) was charged and the mixture was allowed to react at ambient temperature for 10 minutes. A 2.0 ml of styrene (99%) was charged and the mixture was was allowed to react at ambient temperature for 10 minutes. At the end of the reaction, the mixture was dried by nitrogen purging at 40 to 50° C. A free flowing solid was obtained at the end of the preparation. A total of 173 g of polymer was obtained following the polymerization procedure of Example 1.

Example 22

A 10 g of silica gel (Davison D-948, APS=35 μm, dried at 600° C.) was charged into an 8 oz bottle equipped with a magnetic stirring bar. Into a 4 oz bottle equipped with a magnetic stirring bar, a 0.2 g of rac-Me$_2$Si(2-methyl-4-naphtyl-1-Indenyl)$_2$ZrCl$_2$ and 11.1 ml of MAO in toluene solution (30 wt %) were charged. The mixture was stirred at ambient temperature for 10 minutes. A 30 ml of toluene was added into the 4 oz bottle. The mixture was then transferred into the 8 oz bottle containing the silica gel. The mixture was allowed to react at ambient temperature for 10 minutes. A 0.2 ml of phenyldimethylvinylsilane was charged and the mixture was allowed to react at ambient temperature for 30 minutes. At the end of the reaction, the mixture was dried by nitrogen purging at 40 to 50° C. A free flowing solid was obtained at the end of the preparation. A total of 102 g of polymer was obtained following the polymerization procedure of Example 1.

Example 23

A 10 g of silica gel (Davison D-948, APS=35 μm, dried at 600° C.) and 40 ml of hexane were charged into an 8 oz bottle equipped with a magnetic stirring bar. Into a 4 oz bottle equipped with a magnetic stirring bar, a 0.2 g of rac-Me$_2$Si(2-methyl-4-naphthyl-1-Indenyl)$_2$ZrCl$_2$ and 11.1 ml of MAO in toluene solution (30 wt %) were charged. The mixture was stirred at ambient temperature for 10 minutes. A 0.2 ml of phenyldimethylvinylsilane was charged into the 4 oz bottle and the mixture was allowed to react at ambient temperature for 1 hour. The mixture was then transferred into the 8 oz bottle containing the silica gel The mixture was allowed to react at ambient temperature for 10 minutes. At the end of the reaction, the mixture was dried by nitrogen purging at 40 to 50° C. A free flowing, solid was obtained at the end of the preparation. A total of 122 g of polymer was obtained following the polymerization procedure of Example 1.

Example 24

Example 22 was repeated except that a 0.5 ml of phenyldimethylvinylsilane was used in the preparation. A total of 111 g of polymer was obtained following the polymerization procedure of Example 1.

Example 25

Example 22 was repeated except that a 0.5 ml of phenylmethylvinylsilane was used in the preparation. A total of 57 g of polymer was obtained following the polymerization procedure of Example 1.

Example 26

Example 22 was repeated except that a 0.5 ml of vinyltrimethylsilane was used in the preparation. A total of 10 g of polymer was obtained following the polymerization procedure of Example 1.

Example 27

A 10 g of silica gel (Davison D-948, APS=35 μm, dried at 600° C.) was charged into an 8 oz bottle equipped with a magnetic stirring bar. Into a 4 oz bottle equipped with a magnetic stirring bar, a 0.2 g of rac-Me$_2$Si(2-Me-4-naphtyl-1-Ind)$_2$ZrCl$_2$ and 11.1 ml of MAO in toluene solution (30 wt %) were charged. The mixture was stirred at ambient temperature for 10 minutes. A 0.1 ml of phenyldimethylvinylsilane was charged and the mixture was allowed to react at ambient temperature for 1 hour. A 30 ml of toluene solvent was charged into the mixture and the mixture was then transferred into the 8 oz bottle containing the silica gel The mixture was allowed to react at ambient temperature for 10 minutes. At the end of the reaction, the mixture was dried by nitrogen purging at 40 to 50° C. A free flowing solid was obtained at the end of the preparation. A total of 48 g of polymer was obtained following the polymerization procedure of Example 1.

Example 28

Example 27 was repeated except that a 0.5 ml of phenyldimethylvinylsilane was used in the preparation. A total of 120 g of polymer was obtained following the polymerization procedure of Example 1.

Example 29

A 10 g of silica gel (Davison D-948, APS=35 µm, dried at 600° C.) was charged into an 8 oz bottle equipped with a magnetic stirring bar. Into a 4 oz bottle equipped with a magnetic stirring bar, a 0.2 g of rac-Me$_2$Si(2-Me-4-naphthyl-1-Ind)$_2$ZrCl$_2$ and 11.1 ml of MAO in toluene solution (30 wt %) were charged. The mixture was stirred at ambient temperature for 10 minutes. A 30 ml of toluene solvent was then charged into the mixture and the mixture was then transferred into the 8 oz bottle containing the silica gel. The mixture was allowed to react at ambient temperature for 10 minutes. A 0.5 ml of styrene (99%) was charged into the bottle and the mixture was allowed to react at ambient temperature for 10 minutes. At the end of the reaction, the mixture was dried by nitrogen purging at 40 to 50° C. A free flowing solid was obtained at the end of the preparation. A total of 61 g of polymer was obtained following the polymerization procedure of Example 1.

Example 30 (Comparison)

Example 22 was repeated except that no phenyldimethylvinylsilane was used in the preparation. A total of 32 g of polymer was obtained following the polymerization procedure of Example 1.

Example 31

A 5 g of silica gel (Davison D-948, APS=35 µm, dried at 600° C.) was charged into a 125 ml bottle equipped with a magnetic stirring bar. Into a 50 ml bottle equipped with a magnetic stirring bar, a 0.055 g of rac-Me$_2$Si(2-Me-Ind)$_2$ZrCl$_2$ and 5.5 ml of MAO in toluene solution (30 wt %) were charged. The mixture was stirred at ambient temperature for 10 minutes. A 12.5 ml of toluene solvent was charged into the 55 ml bottle and the mixture was then transferred into the 125 ml bottle containing the silica gel. The mixture was allowed to react at ambient temperature for 10 minutes. A 0.15 ml of phenyldimethylvinylsilane was charged into the bottle and the mixture was allowed to react at ambient temperature for 2 hours. At the end of the reaction, the mixture was dried by nitrogen purging at 40 to 50° C. A free flowing solid was obtained at the end of the preparation. A total of 269 g of polymer was obtained following the polymerization procedure of Example 1.

Example 32

A 10 g of silica gel (Davison D-948, APS=35 µm, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind$_2$ZrCl$_2$ and 11.1 ml of MAO in toluene solution (30 wt %) were charged. A 30 ml of toluene solvent was charged into the 4 oz bottle and the mixture was stirred at ambient temperature for 1 hour. A 0.3 ml of phenyldimethylvinylsilane was charged into the 4 oz bottle and the mixture was allowed to react at ambient temperature for 1 hour. At the end of the reaction, the mixture was transferred into the 8 oz bottle containing the silica gel. The mixture was allowed to react at ambient temperature for 10 minutes. At the end of the reaction, the mixture was dried by nitrogen purging at 40 to 50° C. A free flowing solid was obtained at the end of the preparation. A total of 298 g of polymer was obtained following the polymerization procedure of Example 1.

Example 33

A 10 g of silica gel (Davison D-948, APS=35 µm, dried at 600° C.) was charged into an 8 oz bottle equipped with a magnetic stirring bar. Into a 4 oz bottle equipped with a magnetic stirring bar, a 0.11 g of rac-Me$_2$Si(2-Me-Ind)$_2$ZrCl$_2$ and 0.3 ml of phenyldimethylvinylsilane was charged and the mixture was allowed to react at ambient temperature for 1 hour. A 11.1 ml of MAO in toluene solution (30 wt %) and 30 ml of toluene solvent was charged into the 4 oz bottle and the mixture was stirred at ambient temperature for 1 hour. At the end of the reaction, the mixture was transferred into the 8 oz bottle containing the silica gel. The mixture was allowed to react at ambient temperature for 10 minutes. At the end of the reaction, the mixture was dried by nitrogen purging at 40 to 50° C. A free flowing solid was obtained at the end of the preparation. A total of 282 g of polymer was obtained following the polymerization procedure of Example 1.

Example 34

Example 29 was repeated except that a 0.5 ml of 4-t-butylstyrene was used in the preparation. A total of 85 g of polymer was obtained following the polymerization procedure of Example 1.

Example 35

Example 29 was repeated except that a 3.8 ml of 4-vinylbiphenyl in toluene solution (1 M) was used in the preparation. A total of 56 g of polymer was obtained following the polymerization procedure of Example 1.

Example 36

Example 29 was repeated except that a 3.8 ml of 4-vinylnaphthalene in toluene solution (1 M) was used in the preparation. A total of 44 g of polymer was obtained following the polymerization procedure of Example 1.

Example 37

Example 29 was repeated except that a 0.5 ml of vinyldiethylmethylsilane was used in the preparation. A total of 54 g of polymer was obtained following the polymerization procedure of Example 1.

Example 38

Example 27 was repeated except that a 0.2 ml of allylbenzene was used in the preparation. A total of 80 g of polymer was obtained following the polymerization procedure of Example 1.

Example 39

Example 27 was repeated except that a 0.5 ml of allylbenzene was used in the preparation. A total of 80 g of polymer was obtained following the polymerization procedure of Example 1.

Example 40

5.0 g of silica calcined at 600° C. was massed and placed in a 50 ml round bottom flask. 40 ml of toluene and a magnetic stirring bar were added and the mixture was stirred. 0.6 ml (38 mmol) of N,N-diethyl aniline was added and the mixture was allowed to stir for two minutes. 1.9 g (3.8 mmol) of tris(perfluoro phenyl)boron was added as a solid. After two hours of stirring the mixture was filtered and washed with 100 ml of toluene. It was then reslurried in 40 ml of toluene. 0.36 g (0.61 mmol) of dimethyl silanediylbis (2-methyl-4-phenylindenyl)zirconium dichloride was added as a solid. After one minute of stirring, 0.5 ml (4.36 mmol) of styrene was added. The mixture was stirred for forty five minutes. It was then filtered, washed with 200 ml of toluene, and vacuum dried. 5.69 g of dried catalyst was obtained.

0.25 mmol of triethylaluminum was added to a 2 L stainless steel reactor. 1 L of liquid propylene was then introduced. The reactor temperature was raised to 70° C. with stirring. 40.2 mg of the dried catalyst prepared above was added with 250 ml of liquid propylene to initiate the polymerization. After one hour of polymerization, the reactor was vented and the polymer was removed. Polymer yield: 552 g. Polymerization activity: 13700 gPP/gcat

Example 41 (Comparative)

The above procedure was followed except that styrene was not introduced. 6.181 g of dried catalyst was obtained.

The polymerization procedure of Example 40 was used with 41.2 mg of the dried catalyst prepared above. Polymer yield for one hour polymerization: 83.7 g. Polymerization activity: 2030 gPP/gcat.

Example 42

Example 17 was repeated except that 0.1 g of rac-Me$_2$Si (2-Me-4-Ph-Ind)$_2$ZrCl$_2$ and 0.055 g of rac-Me$_2$Si(2-Me-Ind)$_2$ZrCl$_2$ mixture was used in the preparation. A total of 262 g of polymer was obtained following the procedure of Example 1.

TABLE 1

| Example | Metallocene (MCN) | Promoter | Promoter/MCN Ratio | Activity g/g · hr |
|---|---|---|---|---|
| 1 | Me$_2$Si(2-Me-4-Phindenyl)$_2$ZrCl$_2$ | Styrene | 54.6 | 2112 |
| 2 | Me$_2$Si(2-Me-4-Phindenyl)$_2$ZrCl$_2$ | Styrene | 27.3 | 2380 |
| 3 | Me$_2$Si(2-Me-4-Phindenyl)$_2$ZrCl$_2$ | Styrene | 13.7 | 2460 |
| 4 | Me$_2$Si(2-Me-4-Phindenyl)$_2$ZrCl$_2$ | Styrene | 136.7 | 1180 |
| 5 | Me$_2$Si(2-Me-4-Phindenyl)$_2$ZrCl$_2$ | Styrene | 54.6 | 2040 |
| 6 (comparison) | Me$_2$Si(2-Me-4-Phindenyl)$_2$ZrCl$_2$ | none | — | 1720 |
| 7 | Me$_2$Si(2-Me-4-Phindenyl)$_2$ZrCl$_2$ | Styrene | 27.3 | 2420 |
| 8 | Me$_2$Si(2-Me-4-Phindenyl)$_2$ZrCl$_2$ | Styrene | 13.7 | 2670 |
| 9 | Me$_2$Si(2-Me-4-Phindenyl)$_2$ZrCl$_2$ | Styrene | 6.9 | 2131 |
| 10 | Me$_2$Si(2-Me-4-Phindenyl)$_2$ZrCl$_2$ | 4-methyl-styrene | 11.9 | 2620 |
| 11 | Me$_2$Si(2-Me-4-Phindenyl)$_2$ZrCl$_2$ | 4-t-butyl-styrene | 8.6 | 1580 |
| 12 | Me$_2$Si(2-Me-4-Phindenyl)$_2$ZrCl$_2$ | 4-fluoro-styrene | 13.1 | 2480 |
| 13 | Me$_2$Si(2-Me-4-Phindenyl)$_2$ZrCl$_2$ | Styrene | 6.9 | 2560 |
| 14 | Me$_2$Si(2-Me-4-Phindenyl)$_2$ZrCl$_2$ | Styrene | 2.8 | 2480 |
| 15 | Me$_2$Si(2-Me-4-Phindenyl)$_2$ZrCl$_2$ | Styrene | 13.1 | 2320 |
| 16 | Me$_2$Si(2-Me-4-Phindenyl)$_2$ZrCl$_2$ | Styrene | 13.1 | 2400 |

TABLE 2

| Example | Metallocene (MCN) | Promoter | Styrene/MCN Ratio | Hexene-1/MCN Ratio | Activity g/g · hr |
|---|---|---|---|---|---|
| 17 | Me$_2$Si(2-MeInd)$_2$ZrCl$_2$ | Styrene/Hexene-1 | 19.0 | 34.8 | 2800 |
| 18 | Me$_2$Si(2-MeInd)$_2$ZrCl$_2$ | Styrene/Hexene-1 | 7.6 | 17.4 | 2570 |
| 19 | Me$_2$Si(2-MeInd)$_2$ZrCl$_2$ | Styrene/Hexene-1 | 19.0 | 19.0 | 2330 |
| 20 (comparison) | Me$_2$Si(2-MeInd)$_2$ZrCl$_2$ | none | — | — | 1600 |
| 21 | Me$_2$Si(2-MeInd)$_2$ZrCl$_2$ | Styrene | 76.0 | | 1730 |

TABLE 3

| Example | Metallocene (MCN) | Promoter | Promoter/MCN Ratio | Activity g/g · hr |
|---|---|---|---|---|
| 22 | Me$_2$Si(2-Me-4-naphthylInd)$_2$ZCl$_2$ | Phenyldimethyl-vinylsilane | 4.1 | 1020 |
| 23 | Me$_2$Si(2-Me-4-naphthylInd)$_2$ZCl$_2$ | Phenyldimethyl-vinylsilane | 4.1 | 1220 |
| 24 | Me$_2$Si(2-Me-4-naphthylInd)$_2$ZCl$_2$ | Phenyldimethyl-vinylsilane | 10.2 | 1110 |
| 25 | Me$_2$Si(2-Me-4-naphthylInd)$_2$ZCl$_2$ | Phenylmethyl-vinylsilane | 11.1 | 570 |
| 26 | Me$_2$Si(2-Me-4-naphthylInd)$_2$ZCl$_2$ | Vinyltrimethyl-silane | 12.7 | 100 |
| 27 | Me$_2$Si(2-Me-4-naphthylInd)$_2$ZCl$_2$ | Phenyldimethyl-vinylsilane | 2.0 | 480 |
| 28 | Me$_2$Si(2-Me-4-naphthylInd)$_2$ZCl$_2$ | Phenyldimethyl-vinylsilane | 10.2 | 1200 |
| 29 | Me$_2$Si(2-Me-4-naphthylInd)$_2$ZCl$_2$ | Styrene | 16.2 | 610 |
| 30 (comparison) | Me$_2$Si(2-Me-4-naphthylInd)$_2$ZCl$_2$ | None | — | 320 |
| 31 | Me$_2$Si(2-MeInd)$_2$ZCl$_2$ | phenyldimethyl-vinylsilane | 6.9 | 2690 |
| 32 | Me$_2$Si(2-MeInd)$_2$ZCl$_2$ | phenyldimethyl-vinylsilane | 6.9 | 2980 |
| 33 | Me$_2$Si(2-MeInd)$_2$ZCl$_2$ | phenyldimethyl-vinylsilane | 6.9 | 2820 |

TABLE 4

| Example | Metallocene (MCN) | Promoter | Promoter/MCN Ratio | Activity g/g · hr |
|---|---|---|---|---|
| 34 | Me$_2$Si(2-Me-4-naphthylInd)$_2$ZrCl$_2$ | 4-t-butylstyrene | 10.1 | 850 |
| 35 | Me$_2$Si(2-Me-4-naphthylInd)$_2$ZrCl$_2$ | 4-vinylbiphenyl | 14.0 | 560 |
| 36 | Me$_2$Si(2-Me-4-naphthylInd)$_2$ZrCl$_2$ | 4-vinyl-naphthalene | 14.0 | 440 |

TABLE 4-continued

| Example | Metallocene (MCN) | Promoter | Promoter/ MCN Ratio | Activity g/g · hr |
|---|---|---|---|---|
| 37 | Me$_2$Si(2-Me-4-naphthylInd)$_2$ZrCl$_2$ | vinyldiethyl-methylsilane | 10.8 | 540 |
| 38 | Me$_2$Si(2-Me-4-naphthylInd)$_2$ZrCl$_2$ | allylbenzene | 5.6 | 800 |
| 39 | Me$_2$Si(2-Me4-naphthylInd)$_2$ZrCl$_2$ | allylbenzene | 14.0 | 800 |

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present to invention.

Although the appendant claims have single appendencies in accordance with U.S. patent practice, each of the features in any of the appendant claims can be combined with each of the features of other appendant claims or the main claim.

I claim:

1. A method of forming a metallocene catalyst system comprising:

combining at least one metallocene, at least one activator, and at least one promoter wherein the promoter comprises allylbenzene, vinyltrimethylsilane, vinyldiethylmethylsilane, phenylmethylvinylsilane or a compound represented by the formula:

$$R^1R^2R^3MCH=CH_2$$

wherein $R^1$ is a $C_6$–$C_{10}$ aryl group which is optionally halogenated, or a $C_7$–$C_{40}$ alkylaryl group, $R^2$ and $R^3$ are identical or different and are selected from a $C_6$–$C_{10}$ aryl group which is optionally halogenated, a $C_7$–$C_{40}$ alkylaryl group or a $C_1$–$C_{10}$ alkyl group which is optionally halogenated; M is carbon, silicon, germanium or tin, wherein the molar ratio of metallocene to promoter is in the range of from about 1:1 to about 1:1000.

2. The method of claim 1 wherein the ratio is in the range of from about 1:1 to about 1:100.

3. The method of claim 1 wherein the ratio is in the range of from about 1:1 to about 1:50.

4. The method of claim 1 wherein the metallocene is represented by the formula:

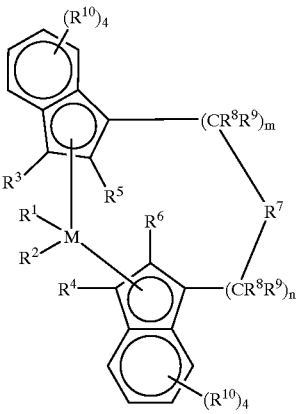

wherein M is selected from the group consisting of titanium, zirconium, hafnium, vanadium, niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which is optionally halogenated, a $C_6$–$C_{10}$ aryl group which is optionally halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —N($R^{15}$)$_2$, —S$R^{15}$, —O$R^{15}$, —OSi($R^{15}$)$_3$ or —P($R^{15}$)$_2$ radical, wherein $R^{15}$ is one of a halogen atom, a $C_1$–$C_{10}$ alkyl group, or a $C_6$–$C_{10}$ aryl group;

$R^7$ is

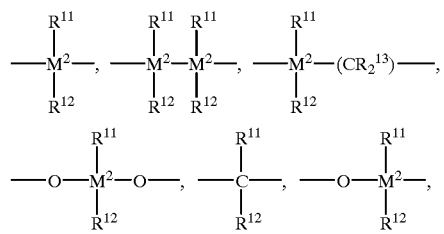

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form a ring system;

$M^2$ is silicon, germanium or tin;

$R^8$ and $R^9$ are identical or different and have the meanings stated for $R^{11}$; m and n are identical or different and are zero, 1 or 2, m plus n being zero, 1 or 2; and the radicals R[10] are identical or different and have the meanings stated for R[11], R[12] and R[13] or two adjacent R[10] radicals are joined together to form a ring system.

5. The method of claim 1 wherein the activator is an alumoxane.

6. The method of claim 1 wherein the combination includes a support material.

7. The method of claim 6 wherein the support material is an inorganic oxide.

8. The method of claim 1 further comprising the step of drying the catalyst system.

9. The method of claim 1 wherein the promoter is added last.

10. The method of claim 1 wherein the metallocene and activator are combined first followed by the promoter.

11. A method for forming a supported metallocene catalyst system comprising:
(a) combining at least one metallocene and at least one activator to form an activated metallocene;
(b) mixing the activated metallocene with support material; and
(c) adding promoter wherein the promoter comprises a compound represented by the formula Ph—Si$_r$R$^1$R$^2$—CH=CH$_2$ wherein R$^1$ and R$^2$ are independently an alkyl group, an arylalkyl group, or an alkylaryl group in an amount such that the molar ratio of metallocene to promoter is in the range of from about 1:1 to about 1:1000.

12. The method of claim 11 wherein the metallocene is represented by the formula:

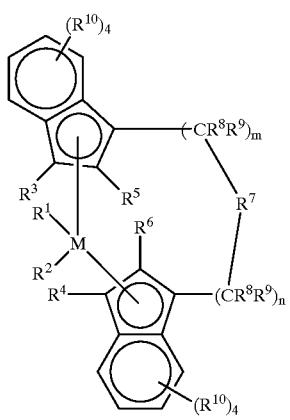

wherein M is selected from the group consisting of titanium, zirconium, hafnium, vanadium, niobium, tantalum, chromium, molybdenum and tungsten;

R$^1$ and R$^2$ are identical or different, are one of a hydrogen atom, a C$_1$–C$_{10}$ alkyl group, a C$_1$–C$_{10}$ alkoxy group, a C$_6$–C$_{10}$ aryl group, a C$_6$–C$_{10}$ aryloxy group, a C$_2$–C$_{10}$ alkenyl group, a C$_7$–C$_{40}$ arylalkyl group, a C$_7$–C$_{40}$ alkylaryl group, a C$_8$–C$_{40}$ arylalkenyl group, or a halogen atom;

R$^3$ and R$^4$ are hydrogen atoms;

R$^5$ and R$^6$ are identical or different, and are one of a halogen atom, a C$_1$–C$_{10}$ alkyl group which is optionally halogenated, a C$_6$–C$_{10}$ aryl group which is optionally halogenated, a C$_2$–C$_{10}$ alkenyl group, a C$_7$–C$_{40}$ arylalkyl group, a C$_7$–C$_{40}$ alkylaryl group, a C$_8$–C$_{40}$ arylalkenyl group, a —N(R$^{15}$)$_2$, —SR$^{15}$, —OR$^{15}$, —OSi(R$^{15}$)$_3$ or —P(R$^{15}$)$_2$ radical, wherein R$^{15}$ is one of a halogen atom, a C$_1$–C$_{10}$ alkyl group, or a C$_6$–C$_{10}$ aryl group;

R$^7$ is

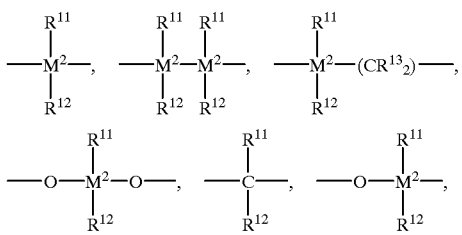

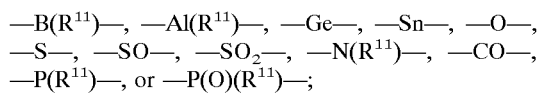

wherein:

R$^{11}$, R$^{12}$ and R$^{13}$ are identical or different and are a hydrogen atom, a halogen atom, a C$_1$–C$_{20}$ alkyl group, a C$_1$–C$_{20}$ fluoroalkyl group, a C$_6$–C$_{30}$ aryl group, a C$_6$–C$_{30}$ fluoroaryl group, a C$_1$–C$_{20}$ alkoxy group, a C$_2$–C$_{20}$ alkenyl group, a C$_7$–C$_{40}$ arylalkyl group, a C$_8$–C$_{40}$ arylalkenyl group, a C$_7$–C$_{40}$ alkylaryl group, or R$^{11}$ and R$^{12}$, or R$^{11}$ and R$^{13}$, together with the atoms binding them, form a ring system;

M$^2$ is silicon, germanium or tin;

R$^8$ and R$^9$ are identical or different and have the meanings stated for R$^{11}$; m and n are identical or different and are zero, 1 or 2, m plus n being zero, 1 or 2; and the radicals R$^{10}$ are identical or different and have the meanings stated for R$^{11}$, R$^{12}$ and R$^{13}$ or two adjacent R$^{10}$ radicals are joined together to form a ring system.

13. The method of claim 11 wherein the activator is an alumoxane.

14. The method of claim 11 wherein the support material is an inorganic oxide.

15. The method of claim 11 further comprising the step of drying the catalyst system.

16. The method of claim 11 wherein the ratio is in the range from about 1:1 to about 1:100.

17. The method of claim 11 wherein the ratio is in the range from about 1:1 to about 1:50.

18. A metallocene catalyst system comprising the reaction product of a mixture comprising a metallocene, an activator, and a promoter wherein the promoter comprises allylbenzene, vinyltrimethylsilane, vinyldiethylmethylsilane, phenylmethylvinylsilane or a compound represented by the formula

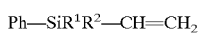

Ph—SiR$^1$R$^2$—CH=CH$_2$ wherein R$^1$ and R$^2$ are independently an alkyl group, an arylalkyl group, or an alkylaryl group; wherein the molar ratio of metallocene to promoter in the mixture is in the range from about 1:1 to about 1:1000.

19. The catalyst system of claim 18 wherein the metallocene is represented by the formula:

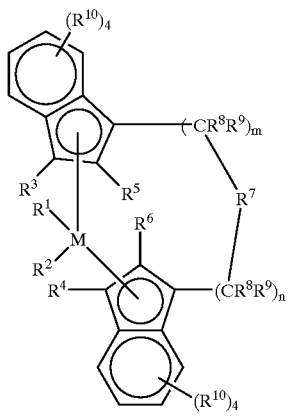

wherein M is selected from the group consisting of titanium, zirconium, hafnium, vanadium, niobium, tantalum, chromium, molybdenum and tungsten, $R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —N($R^{15}$)$_2$, —SR$^{15}$, —OR$^{15}$, —OSi($R^{15}$)$_3$ or —P($R^{15}$)$_2$ radical, wherein $R^{15}$ is one of a halogen atom, a $C_1$–$C_{10}$ alkyl group, or a $C_6$–$C_{10}$ aryl group;

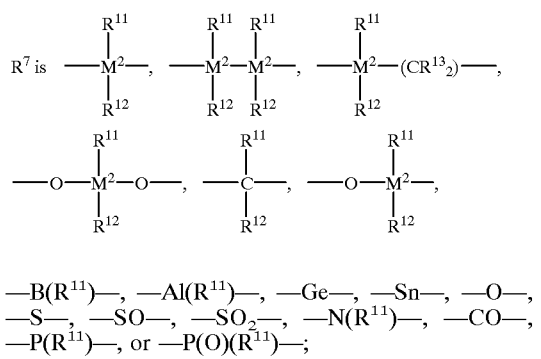

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form a ring system;

$M^2$ is silicon, germanium or tin; $R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ or two adjacent $R^{10}$ radicals are joined together to form a ring system.

20. The catalyst system of claim 18 wherein the activator is an alumoxane.

21. The catalyst system of claim 18 wherein the mixture further comprises a support material.

22. The catalyst system of claim 21 wherein the support material is an inorganic oxide.

23. The catalyst system of claim 18 wherein the ratio of metallocene to promoter is in the range of from about 1:1 to about 1:100.

24. The catalyst system of claim 18 wherein the ratio of metallocene to promoter is in the range of from about 1:1 to about 1:50.

25. The catalyst system of claim 19 wherein the ratio of metallocene to promoter is in the range of from about 1:1 to about 1:100.

26. The catalyst system of claim 19 wherein the ratio of metallocene to promoter is in the range of from about 1:1 to about 1:50.

27. The catalyst system of claim 18 wherein the promoter is selected from phenyldimethylvinylsilane and allylbenzene.

28. A metallocene catalyst system comprising the reaction product of a mixture comprising a metallocene, an activator, and a promoter wherein the promoter comprises styrene, a substituted styrene, allylbenzene, vinyltrimethylsilane, vinyldiethylmethylsilane, phenylmethylvinylsilane or a compound represented by the formula Ph—SiR$^1$R$^2$—CH═CH$_2$ wherein $R^1$ and $R^2$ are independently an alkyl group, an arylalkyl group, or an alkylaryl group; wherein the molar ratio of metallocene to promoter in the mixture is in the range from about 1:1 to about 1:1000; the catalyst system further comprising a 1-olefin copromoter, the mole ratio of the metallocene to the copromoter being in the range of from about 1:1 to about 1:1000.

29. The catalyst system of claim 28 wherein the metallocene is represented by the formula:

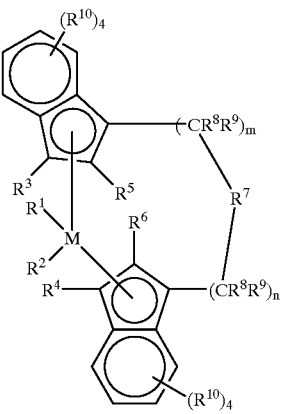

wherein M is selected from the group consisting of titanium, zirconium, hafnium, vanadium, niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which is optionally halogenated, a $C_6$–$C_{10}$ aryl group which is optionally halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$N(R^{15})_2$, —$SR^{15}$, —$OR^{15}$, —$OSi(R^{15})_3$ or —$P(R^{15})_2$ radical, wherein $R^{15}$ is one of a halogen atom, a $C_1$–$C_{10}$ alkyl group, or a $C_6$–$C_{10}$ aryl group;

$R^7$ is

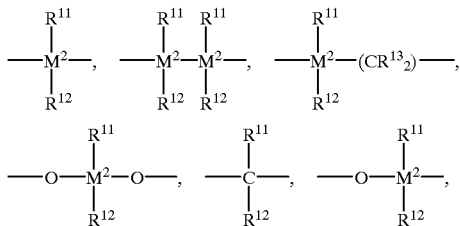

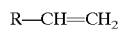

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form a ring system;

$M^2$ is silicon, germanium or tin;

$R^8$ and $R^9$ are identical or different and have the meanings stated for $R^{11}$; m and n are identical or different and are zero, 1 or 2, m plus n being zero, 1 or 2; and the radicals $R^{10}$ are identical or different and have the meanings stated for $R^{11}$, $R^{12}$ and $R^{13}$ or two adjacent $R^{10}$ radicals are joined together to form a ring system.

30. The catalyst system of claim 28 wherein the activator is an alumoxane.

31. The catalyst system of claim 28 wherein the mixture further comprises a support material.

32. The catalyst system of claim 31 wherein the support material is an inorganic oxide.

33. The catalyst system of claim 28 wherein the ratio of metallocene to promoter is in the range of from about 1:1 to about 1:100.

34. The catalyst system of claim 28 wherein the ratio of metallocene to promoter is in the range of from about 1:1 to about 1:50.

35. The catalyst system of claim 28 wherein the ratio of metallocene to copromoter is in the range of from about 1:1 to about 1:100.

36. The catalyst system of claim 28 wherein the ratio of metallocene to copromoter is in the range of from about 1:1 to about 1:50.

37. The catalyst system of claim 28 wherein the copromoter is defined by the formula:

R—CH=CH$_2$ wherein R is a $C_2$–$C_{20}$ alkyl or $C_7$–$C_{40}$ arylalkyl group.

38. The catalyst system of claim 37 wherein the copromoter comprises one or more of butene-1, hexene-1 and octene-1.

39. A method of polymerizing olefins comprising polymerizing olefins in the presence of the catalyst system of claim 18.

40. A method of polymerizing olefins comprising polymerizing olefins in the presence of the catalyst system of claim 19.

41. A method of polymerizing olefins comprising polymerizing olefins in the presence of the catalyst system of claim 28.

42. A method of polymerizing olefins comprising polymerizing olefins in the presence of the catalyst system of claim 29.

43. A method of polymerizing olefins comprising polymerizing olefins in the presence of the catalyst system of claim 38.

44. The method of claim 39 wherein the olefins comprise propylene.

45. The method of claim 40 wherein the olefins comprise propylene.

* * * * *